US005976739A

United States Patent [19]

Lee et al.

[11] Patent Number: 5,976,739

[45] Date of Patent: Nov. 2, 1999

[54] METHOD AND APPARATUS FOR DEVELOPING SCREEN OF CATHODE RAY TUBE

[75] Inventors: Yang-hee Lee; Chae-bok Lim; Jong-ho Cho, all of Kyungki-do, Rep. of Korea

[73] Assignee: Samsung Display Devices Co., Ltd., Kyungki-do, Rep. of Korea

[21] Appl. No.: 09/016,712

[22] Filed: Jan. 30, 1998

[30] Foreign Application Priority Data

Jul. 28, 1997 [KR] Rep. of Korea ...................... 97-35464

[51] Int. Cl.[6] ................................ G03C 5/00; G03B 7/62

[52] U.S. Cl. ............................................... 430/23; 396/546

[58] Field of Search ............................ 118/627; 396/546; 430/23, 30

[56] References Cited

U.S. PATENT DOCUMENTS

| | | | |
|---|---|---|---|
| 5,477,285 | 12/1995 | Riddle et al. | 430/23 |
| 5,807,436 | 9/1998 | Stachelhaus et al. | 118/627 |

*Primary Examiner*—John Goodrow
*Attorney, Agent, or Firm*—Christie, Parker & Hale, LLP

[57] ABSTRACT

A method of developing a screen of a cathode ray tube includes the steps of establishing an uniform electrostatic charge on selected areas of an inner surface of a panel with a predetermined pattern, rotating a nozzle to a predetermined angle with respect to the inner surface of a panel, and moving the rotated nozzle backwards and forwards while spraying a dry-powdered and electrically charged screen structure material on the selected areas of the inner surface of the panel.

20 Claims, 7 Drawing Sheets

METHOD AND APPARATUS FOR DEVELOPING SCREEN OF CATHODE RAY TUBE

BACKGROUND OF THE INVENTION

1. Field of the Invention

The present invention relates to a method and apparatus for developing a screen of a cathode ray tube (CRT) and, more particularly, to a method and apparatus for depositing a light-absorptive black matrix material and a light-emitting phosphor material (referred to hereinafter more simply as 'screen structure material') on an inner surface of a panel by using an electrophotographic screening process.

2. Description of the Related Art

Generally, CRTs are designed to reproduce original picture images through exciting phosphors coated on the inner surface of the panel by electron beams emitted from an electron gun.

The screen portion of the panel is formed with a light-absorptive black matrix layer and a light-emitting phosphor layer.

Conventionally, in the process of forming the black matrix and phosphor layers, slurries of screen structure materials and photosensitive binders are deposited on the panel screen portion. And, this is known as a wet photolithographic screening process.

However, the wet process requires numbers of processing steps as well as large quantities of chemicals, causing an environmental pollution.

Therefore, in recent years, an electrophotographic screening (EPS) method, which uses dry-powdered screen structure materials in the screen developing process, has been widely used in substitute for the photolithographic screening method.

The EPS method includes the steps of cleaning the inner surface of the panel, sequentially forming an organic conductive (OC) layer and an organic photoconductive (OPC) layer on the cleaned surface of the panel, establishing a substantially uniform electrostatic charge on the OPC layer, inserting a shadow mask into the panel, exposing selected areas of the OPC layer to visible light to affect the charge thereon, and developing the selected areas of the OPC layer with a screen structure material. The screen structure material is dry-powdered and tribo-electrically charged before the developing operation.

FIG. 5 is a schematic view of a conventional screen developing apparatus for a CRT illustrating the EPS method. As shown in FIG. 5, the developing apparatus includes a chamber 2 having a supporting member 6 for supporting a panel 4, a screen structure material reservoir 12 for storing and feeding the screen structure material, and a spray gun 10 for spraying the screen structure material on an inner surface of the panel 4.

The spray gun 10 is communicated with the screen structure material reservoir 12 through a tube 8.

The screen structure material is mixed with a suitable quantity of air and fed into the spray gun 10 through the tube 8.

In addition, a grid 16 is provided on the supporting member 6 to control the electric field in the vicinity of the OPC layer coated on the inner surface of the panel 4. And a high voltage source 18 is connected to the grid 16 to supply voltage thereto.

Furthermore, the chamber 2 is provided with an exhaust port 20 to remove excess screen structure material that is not deposited on the inner surface of the panel 4.

In the aforementioned screen developing apparatus, the spray gun 10 receives the screen structure materials passing through the tube 8 and sprays it onto the inner surface of the panel 4. At this time, the spraying operation is performed in such a state that the spray gun 10 is vertically spaced apart from the inner surface of the panel 4 and internally fixed on the center of the chamber 2.

However, in the aforementioned spraying operation, the resultant screen layer on the center and corner portions of the panel is not uniform in thickness because the sprayed screen structure material is relatively focused on the portion toward which the spray gun is directed.

As shown in FIG. 6, the dot width d1 of the central portion of the panel is maintained at 150 $\mu$m while the dot width d2 of the corner or peripheral portion is maintained at 100~150 $\mu$m.

Accordingly, difference in the dot width of the screen structure material on the center and corner of the panel causes serious defects in the CRT screen.

SUMMARY OF THE INVENTION

Accordingly, the present invention is directed to a method and apparatus for developing a screen of a CRT which substantially obviates one or more of the problems due to limitations and disadvantages of the related art.

An object of the present invention is to provide a method and apparatus for developing a screen of a CRT which uniformly deposits screen structure materials on an inner surface of a panel by using an EPS process.

Additional features and advantages of the invention will be set forth in the description which follows, and in part will be apparent from the description, or may be learned by practice of the invention. The objects and other advantages of the invention will be realized and attained by the structure particularly pointed out in the written description and claims hereof as well as the appended drawings.

To accomplish these and other advantages, the CRT screen developing method includes the steps of establishing an uniform elelctrostatic charge on selected areas of an inner surface of a panel with a predetermined pattern, rotating a nozzle to a predetermined angle with respect to the inner surface of the panel, and moving the rotated nozzle backwards and forwards while spraying a dry-powdered and tribo-electrically charged screen structure material on the selected areas of the inner surface of the panel, thereby uniformly depositing the screen structure material on the inner surface of the panel.

It is preferable that the rotation angle of the nozzle is not exceeding 25 either in a clockwise direction or an opposite direction thereto.

In the meantime, the CRT screen developing apparatus includes a chamber provided with an interior portion, a top portion having an opening for mounting a panel and a lateral portion having a longitudinal hole, a spray unit for spraying a dry-powdered and tribo-electrically charged screen structure material on an inner surface of the panel, a driving unit connected to the spray unit to move the spray unit backwards and forwards along the longitudinal hole of the chamber, and a screen structure material reservoir communicated with the spray unit to feed the screen structure material thereto.

The spray unit preferably includes a first tube having a plurality of nozzles within the chamber, and a second tube having an end connected to the first tube, a middle portion passing through the longitudinal hole of the chamber and an opposing end connected to the screen structure material reservoir. The first and second tubes are rotatably installed on the interior and exterior sides of the chamber.

A scale indicator is preferably provided on the second tube to indicate the rotation angle of the nozzle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate a particular embodiment of the invention and, together with the description, serve to explain the principles of the invention. In the drawings.

Figure 1:
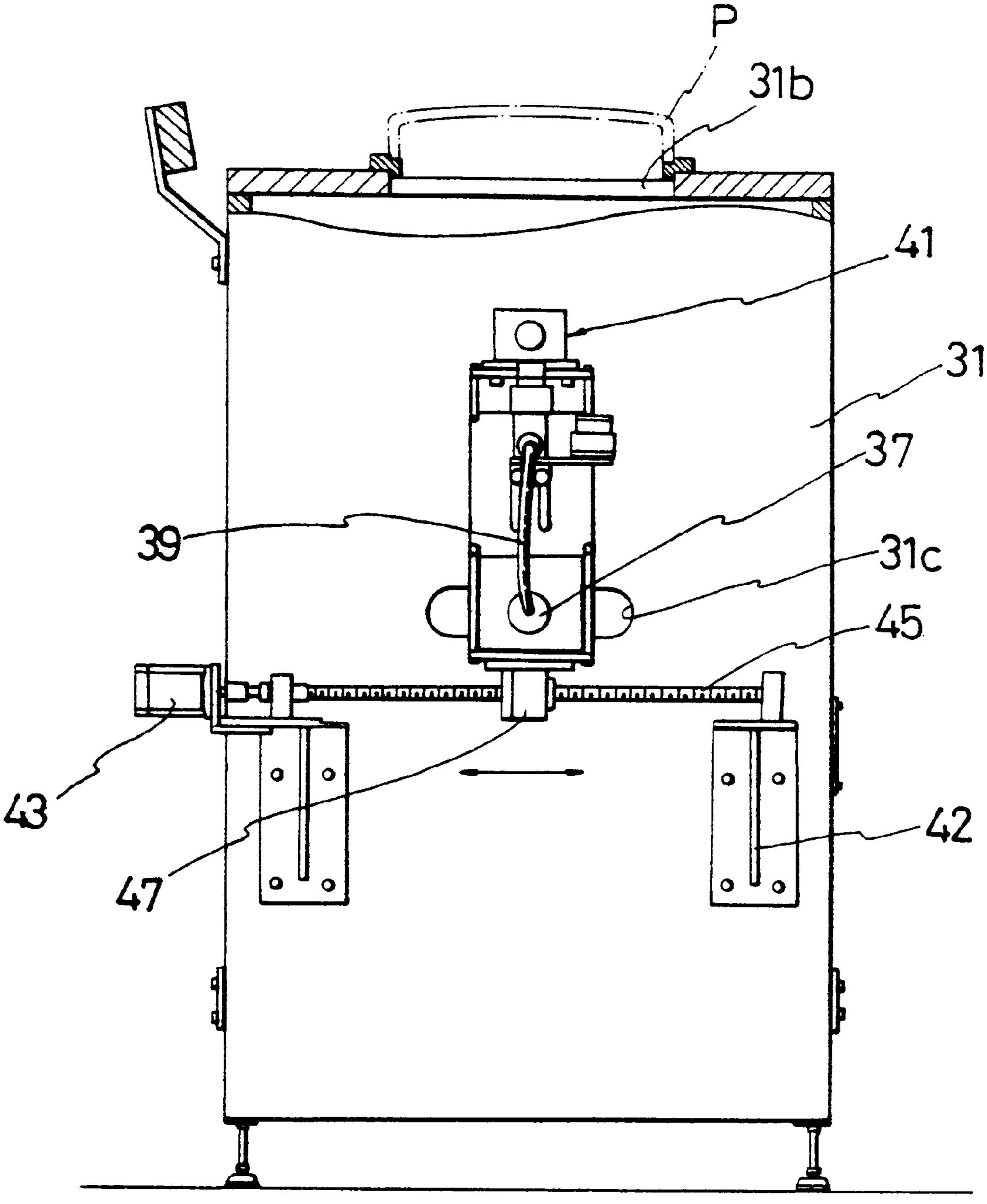
FIG. 1 is a partially sectional front view of a screen developing apparatus for a CRT according to a preferred embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawing and description are to be regarded as illustrative in nature, and not as restrictive.

DETAILED DESCRIPTION OF THE INVENTION

Reference will now be made in detail to the preferred embodiment of the present invention, examples of which are illustrated in the accompanying drawings.

Figure 2:
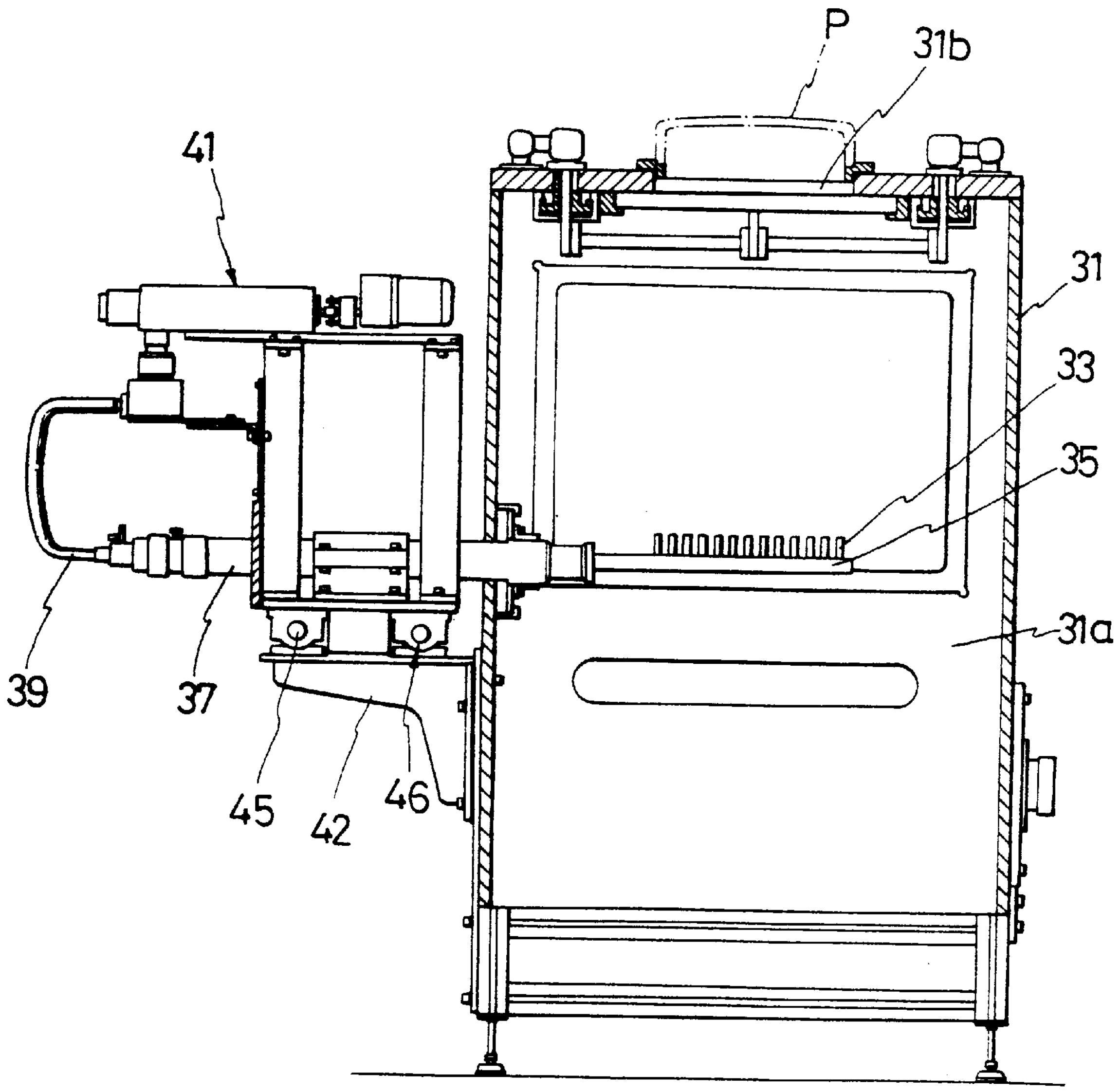
FIG. 2 is a partially sectional side view of the screen developing apparatus according to the preferred embodiment.

FIG. 1 is a partially sectional front view of a screen developing apparatus for a CRT according to a preferred embodiment of the present invention, and FIG. 2 is a partially sectional side view of the screen developing apparatus according to the preferred embodiment.

As shown in FIGS. 1 and 2, the screen developing apparatus includes a chamber 31 which is provided with an interior portion 31*a*, a top portion having an opening 31*b* and a lateral portion having a longitudinal hole 31*c*. A panel P is mounted on the top portion of the chamber 31 through the opening 31*b*. The inner surface of the panel P has been selectively charged through the previous processing steps.

The developing apparatus further includes a spray unit for spraying a screen structure material onto the inner surface of the panel P.

The spray unit includes a first tube 35 having a plurality of nozzles 33 positioned under the opening 31*b*, and a second tube 37 having an end connected to the first tube 35, a middle portion passing through the longitudinal hole 31*c* of the chamber 31 and an opposing end connected to an end of a hose 39. The first and second tubes are installed such that they can be rotated along their axis.

The opposing end of the hose 39 is connected to a screen structure material reservoir 41. That is, the second tube 37 is communicated with the screen structure material reservoir 41 through the hose 39.

Meanwhile, the spray unit reciprocates in a horizontal direction with respect to the chamber 31 by a driving unit. The driving unit includes a motor 43 provided on an external portion of the chamber 31, a ball screw 45 combined with the motor 43 and rotatably fixed on the chamber 31 by using brackets 42, and a nut member 47 engaged with the ball screw 45 and fixed on the bottom portion of the second tube 37. Furthermore, a guide member 46 is provided parallel to the ball screw 45 to guide the spray unit while supporting it.

When the ball screw 45 is rotated by the motor 43, the nut member 47 is horizontally moved so that the spray unit reciprocates along the longitudinal hole 31*c*.

In the aforementioned developing apparatus, the screen structure material contained in the reservoir 41 is fed to the first tube 35 through the hose 39 and the second tube 37. Thereafter, it is sprayed onto the inner surface of the panel P through the nozzles 33 provided in the second tube 37.

At this time, the screen structure material has a polarity identical with or opposite to that of the selectively charged portion of the panel P.

In the meantime, the screen structure material spraying operation proceeds like the below.

Figure 3A:
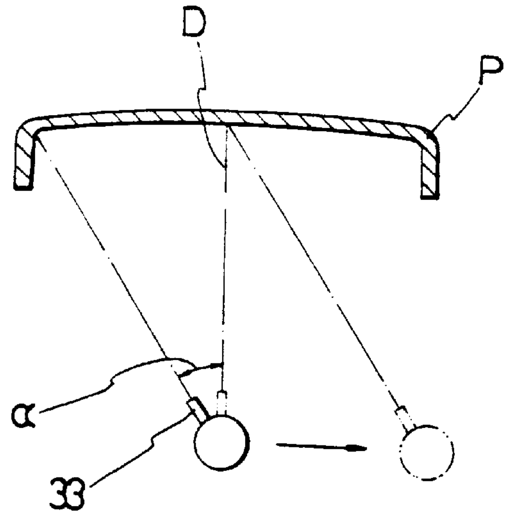
FIG. 3*a* is a view illustrating a state of a nozzle before beginning a first spraying operation with respect to half an inner surface of a panel according to the preferred embodiment.

As shown in FIG. 3*a*, the nozzle 33 is, at its initial state, placed under the central portion of the panel P perpendicular thereto.

The nozzle 33 is rotated to a predetermined angle $\alpha$ toward a corner of the panel on the one side. At this time, the rotation of the nozzle 33 is obtained in such a way that the worker manually rotates the second tube 37. It is preferable that the rotation angle $\alpha$ of the nozzle 33 is maintained at not exceeding 25° with respect to a vertical center line D.

Thereafter, the first and second tubes 35 and 37 is horizontally moved upon receipt of driving force from the motor 43 to the right on the basis of the figure such that the nozzle 33 is focused on the central point of the panel P. At this state, a first spraying operation is performed.

Figure 3B:
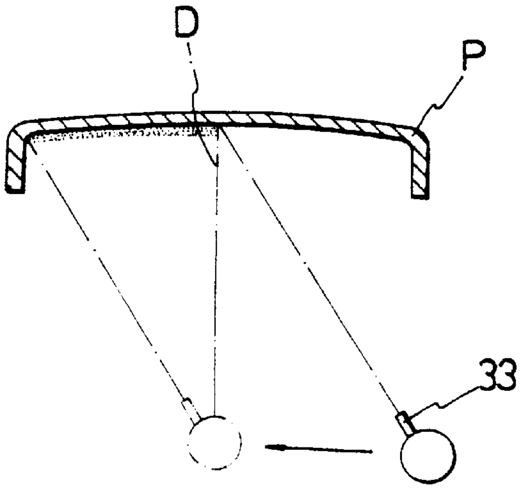
FIG. 3*b* is a view illustrating a state of the nozzle during the first spraying operation according to the preferred embodiment.

As shown in FIG. 3*b*, the first spraying operation is performed in such a way that the nozzle 33 returns to the initial position while spraying the screen structure material onto the inner surface of the panel P. As a result, the screen structure material is applied on half the entire portion of the panel surface.

Figure 3C:
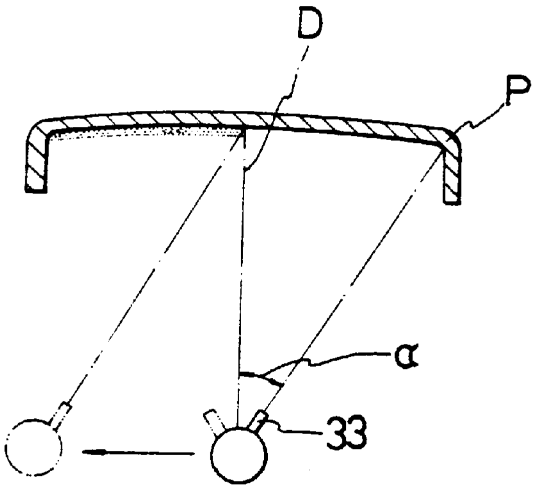
FIG. 3*c* is a view illustrating a state of the nozzle before beginning a second spraying operation with respect to the residual half portion of the panel according to the preferred embodiment.
Figure 3D:
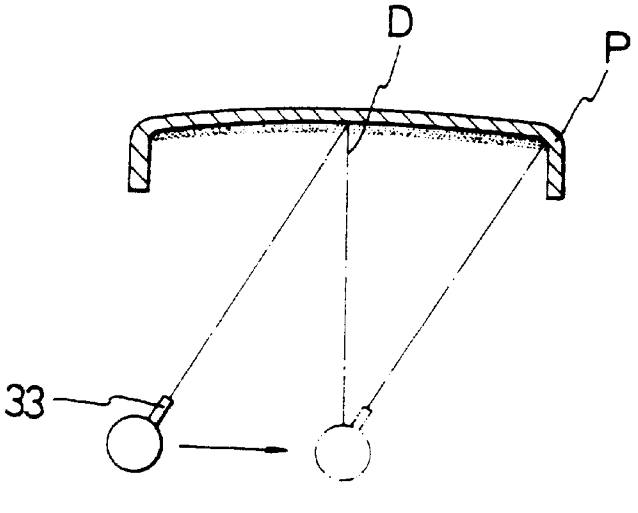
FIG. 3*d* is a view illustrating a state of the nozzle during the second spraying operation according to the preferred embodiment.

On the other hand, to complete the spraying operation with respect to the residual half portion, the nozzle 33 is rotated toward a corner of the panel on the other side. As is in the first spraying operation, the rotation of the nozzle 33 is manually performed and the rotation angle α is also maintained at not exceeding 25° with respect to the vertical center line D as shown in FIG. 3*c*.

In such a state, the nozzle 33 returns to the initial position while spraying the screen structure material onto the residual half portion of the panel P. As a result, the screen structure material is applied on the entire portion of the panel surface.

In the meantime, the rotation angle α of the nozzle 33 has been adopted after passing through the experimental tests as shown below.

TABLE 1

| Test | Angle of nozzle | Dot width (μm) of screen structure material | |
|---|---|---|---|
| | | Center | Corner |
| 1 | 25 | 155 | 160 |
| 2 | 20 | 155 | 155 |
| 3 | 14 | 160 | 120 |
| 4 | 0 | 155 | 120 |

As given in TABLE 1, in case the nozzle 33 is rotated to 20°, the dot width of the screen structure material is uniform on the center and corner of the inner surface of the panel P. In contrast, in case the nozzle 33 is in a position perpendicular to the panel, that is, the angle of the nozzle is at 0°, the dot width of the screen structure material is largely differentiated on the center and corner.

Meanwhile, in this preferred embodiment, the nozzle 33 is manually rotated. However, it is easily understandable that the nozzle 33 can be automatically rotated.

For the purpose of correctly determining the angle of the nozzle 33, a scale indicator 51 is provided in the spray unit to indicate the rotation angle of the nozzle 33.

Figure 4:
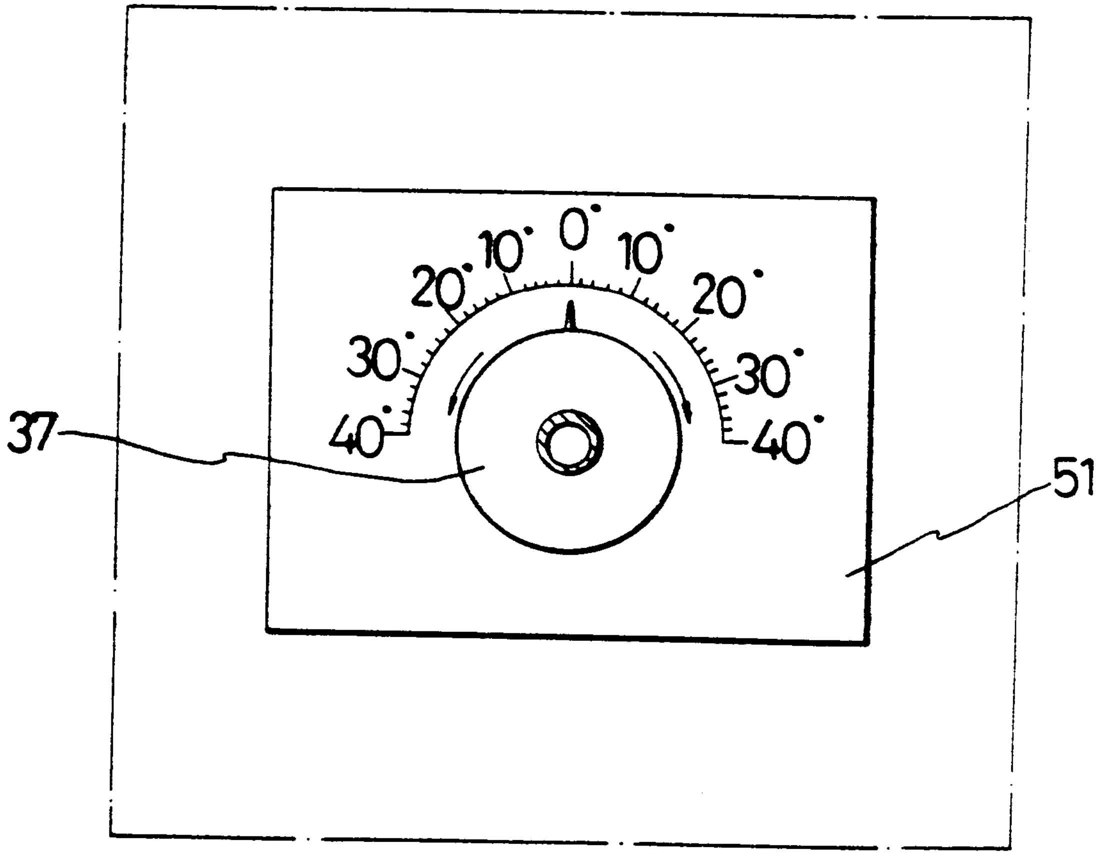
FIG. 4 is a view showing a display portion of a scale indicator according to the preferred embodiment.
Figure 5:
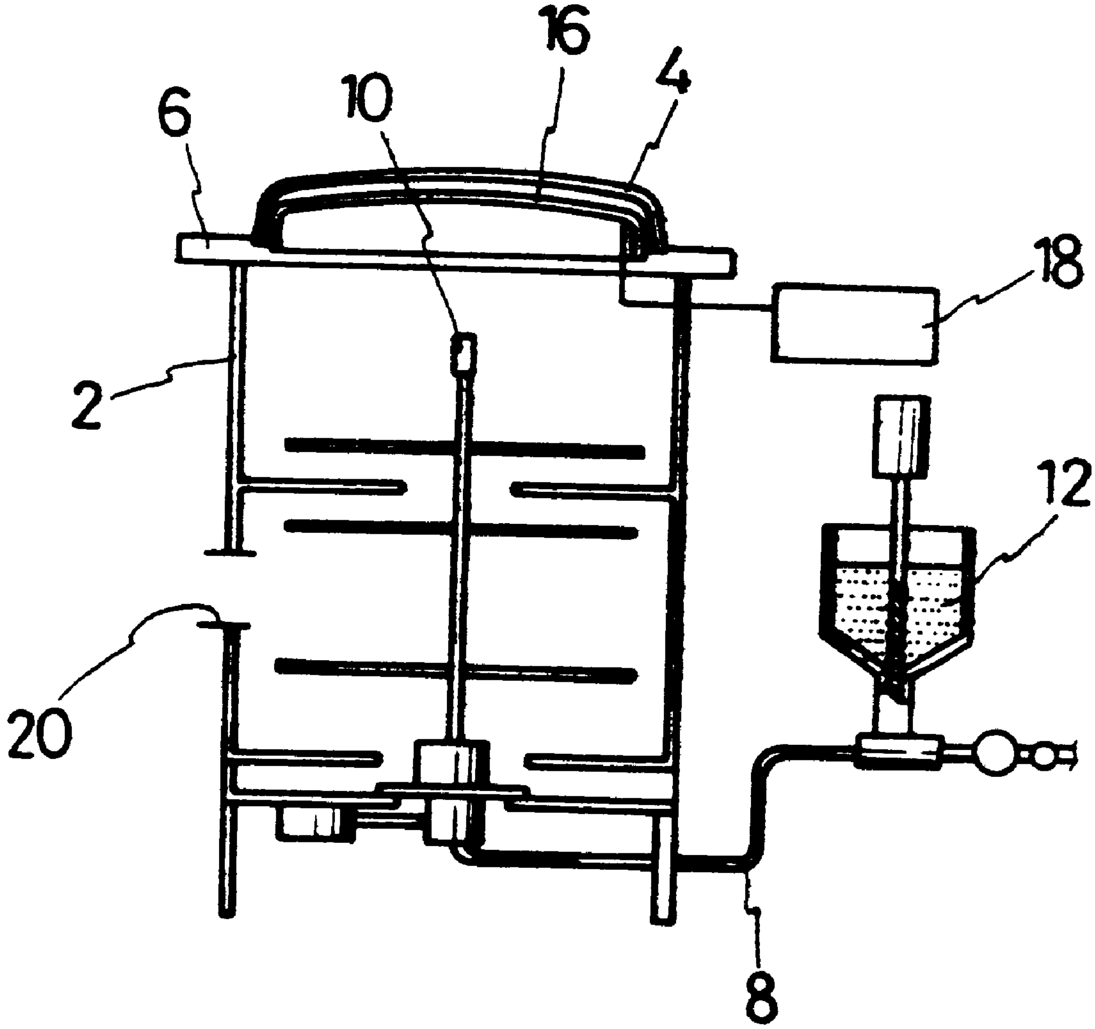
FIG. 5 Prior Art
FIG. 5 is a schematic view of a conventional screen developing apparatus for a CRT.
Figure 6:
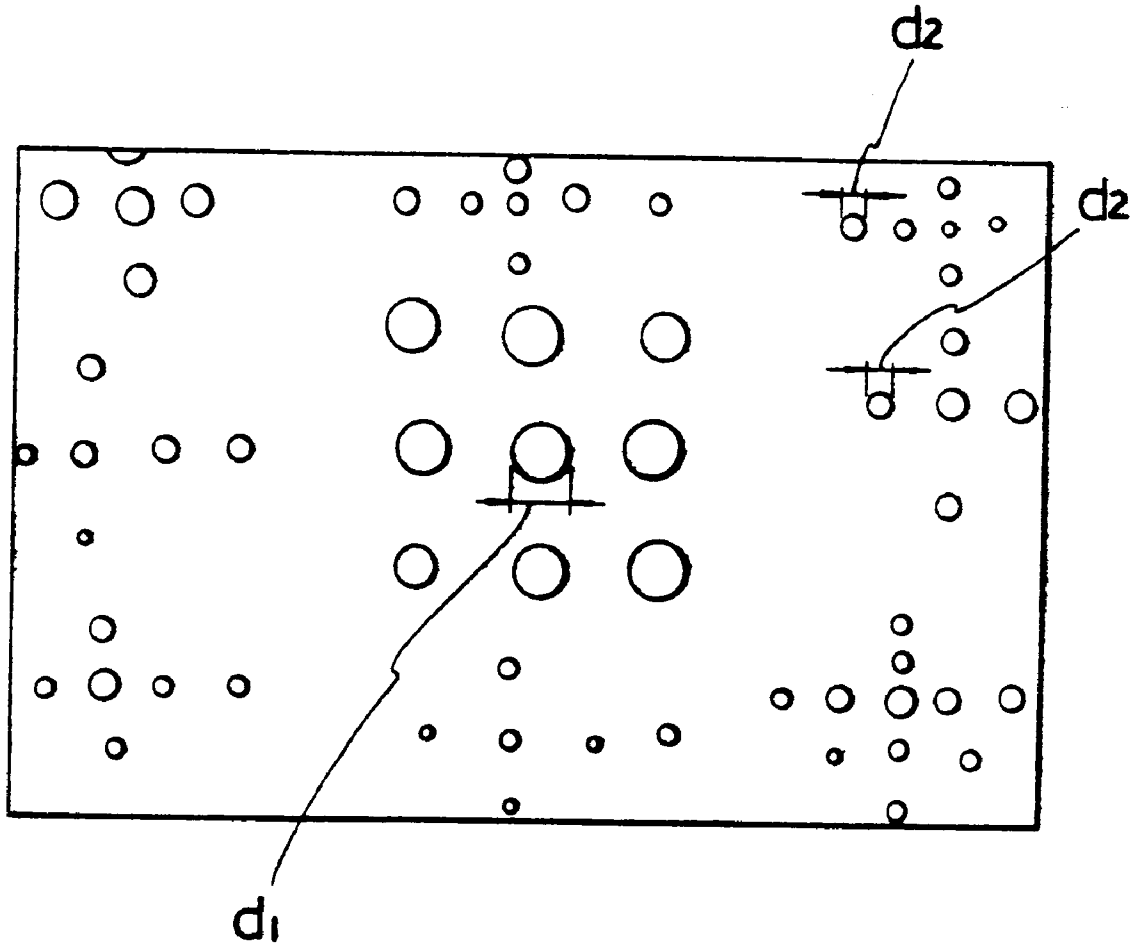
FIG.6 Prior Art
FIG. 6 is a view showing widths of the dots deposited on the inner surface of the panel according to the conventional screen developing method.

As shown in FIG. 4, the scale indicator 51 is mounted on the second tube 37 and marks an angle scale on its display portion. Thus, the worker manually rotates the second tube 37 while seeing the scale indicator 51 so as to correctly set the angle of the nozzle 33.

As described above, in the inventive screen developing method, the screen structure material is uniformly developed on the center and corner so that an uniform screen pattern can be obtained, thereby elevating white uniformity and brightness of the CRT.

It will be apparent to those skilled in the art that various modifications and variations can be made in the method of developing the CRT screen of the present invention without departing from the spirit or scope of the invention. Thus, it is intended that the present invention cover modifications and variations of this invention provided they come within the scope of the appended claims and their equivalents.

What is claimed is:

1. A method for developing a screen portion of a panel for a cathode ray tube, the panel having an inner surface, the method comprising the steps of:

establishing a substantially uniform electrostatic charge on selected areas of the inner surface of the panel;

rotating a nozzle to a predetermined angle with respect to an axis perpendicular to the inner surface of the panel; and moving the rotated nozzle in a direction parallel to the inner surface of the panel while spraying an electrically charged dry powder screen structure material on the selected areas of the inner surface of the panel.

2. The method of claim 1 wherein the predetermined angle does not exceed 25°.

3. An apparatus for developing a screen portion of a panel for a cathode ray tube, the panel having an inner surface, the apparatus comprising:

a chamber including an interior portion, a top portion having an opening for mounting the panel, and a lateral portion having a longitudinal hole;

a spray unit comprising a first tube having at least one nozzle positioned thereon for spraying a tribo-electrically charged dry powder screen structure material on the inner surface of the panel, said first tube and nozzle being rotatable to a predetermined angle with respect to an axis perpendicular to the top portion of the chamber;

a driving unit connected to the spray unit to move the spray unit in a direction parallel to the inner surface of the panel along the longitudinal hole of the chamber; and a screen structure material reservoir connected to the spray unit to feed the screen structure material thereto.

4. The developing apparatus of claim 3 wherein the spray unit comprises a first tube having a plurality of nozzles positioned under the opening of the chamber, and a second tube having an end connected to the first tube, a middle portion passing through the longitudinal hole of the chamber and an opposing end connected to the screen structure material reservoir, the first and second tubes being rotatable along their central axes.

5. The developing apparatus of claim 3 wherein the driving unit comprises a motor external to the chamber, a ball screw connected to the motor and fixed on the chamber, and a nut member engaged with the ball screw and fixed on a bottom portion of the second tube.

6. The developing apparatus of claim 4 further comprising a scale indicator on the second tube to indicate a rotation angle of the nozzles.

7. A method for developing a screen portion of a panel for a cathode ray tube, the panel having an inner surface, the method comprising the steps of:

aligning a nozzle with an axis perpendicular to the panel;

rotating the nozzle toward an end of the panel to form an angle with respect to the perpendicular axis;

moving the nozzle from an initial position in a first direction; and moving the rotated nozzle in a second direction, opposite said first direction, while spraying an electrically charged dry powder screen structure material on the inner surface of the panel.

8. The method of claim 7 wherein the step of moving the rotated nozzle in the first direction is performed until the nozzle is focused on a center of the panel.

9. The method of claim 7 wherein the step of moving the rotated nozzle in the second direction is performed until the nozzle is returned to the initial position.

10. The method of claim 9 further comprising the steps of:

rotating the nozzle toward an opposing end of the panel after said nozzle is returned to the initial position to form a second angle with respect to the perpendicular axis;

moving the second angularly rotated nozzle from the initial position in the second direction; and moving the second angularly rotated nozzle in the first direction while spraying the electrically charged dry powder screen structure material on the inner surface of the panel.

11. The method of claim 10 wherein the step of moving the second angularly rotated nozzle in the second direction is performed until the nozzle is focused on a center of the panel.

12. The method of claim 10 wherein the step of moving the second angularly rotated nozzle in the first direction is performed until the nozzle is returned to the initial position.

13. A method for developing a screen portion of a panel for a cathode ray tube, the panel having an inner surface, the method comprising the steps of:

rotating a nozzle to a first angle with respect to an axis perpendicular to the panel;

spraying an electrically charged dry powder screen structure material on a first portion of the inner surface of the panel by moving the first angularly rotated nozzle in a first direction;

rotating the nozzle to a second angle with respect to the perpendicular axis; and spraying the electrically charged dry powder screen structure material on a second portion of the inner surface of the panel by moving the second angularly rotated nozzle in a second direction, opposite the first direction.

14. The method of claim 1, wherein the screen structure material is sprayed directly onto the inner surface of the panel.

15. The method of claim 1, wherein the rotated nozzle is moved backward and forward.

16. The apparatus of claim 3, wherein the at least one nozzle is capable of spraying the screen structure material directly onto the inner surface of the panel.

17. The apparatus of claim 3, wherein the driving unit moves the rotated first tube and nozzle backward and forward along the longitudinal hole of the chamber.

18. The method of claim 7, wherein the screen structure material is sprayed directly onto the inner surface of the panel.

19. The method of claim 8, wherein the rotated nozzle is moved from an initial position in a first direction.

20. The method of claim 9 further comprising the steps of:

rotating the nozzle toward an opposing end of the panel to form a second angle with respect to the perpendicular axis;

moving the nozzle from the initial position in the second direction; and moving the second angularly rotated nozzle in the first direction while spraying the electrically charged dry powder screen structure material on the inner surface of the panel.

* * * * *